United States Patent [19]
Jackson

[11] 3,732,855
[45] May 15, 1973

[54] CAMSHAFT DRIVE CONVERTER KIT AND METHOD

[76] Inventor: Maurus E. Jackson, 433-A Magnolia Avenue, Los Angeles, Calif. 91204

[22] Filed: May 12, 1971

[21] Appl. No.: 142,495

[52] U.S. Cl....................................123/90.31, 74/410
[51] Int. Cl....................................F01l 1/00
[58] Field of Search....................123/90.31, 195 A; 74/410, 411

[56] References Cited

UNITED STATES PATENTS

| | | | |
|---|---|---|---|
| 3,225,610 | 12/1965 | Binder | 123/195 A |
| 3,397,589 | 8/1968 | Moore | 74/410 X |
| 1,743,173 | 1/1930 | Warner | 123/195 A |
| 3,610,065 | 10/1971 | Hayashi et al. | 74/410 |

*Primary Examiner*—Charles J. Myhre
*Assistant Examiner*—Barry Grossman
*Attorney*—Sellers & Brace

[57] ABSTRACT

A camshaft drive converter kit and method for converting a stock auto engine from chain-driven camshaft operation to precision gear drive operation without need for machining or otherwise altering the engine structure and simply by substituting kit components for certain stock engine components. The kit includes an idler gear subassembly designed for limited floating freedom of movement in the plane of the idler and arranged to seek a precision operating position as an incident to engine starting. This subassembly includes a second idler which serves to limit idler movement in one direction and certain other incidental functions.

30 Claims, 5 Drawing Figures

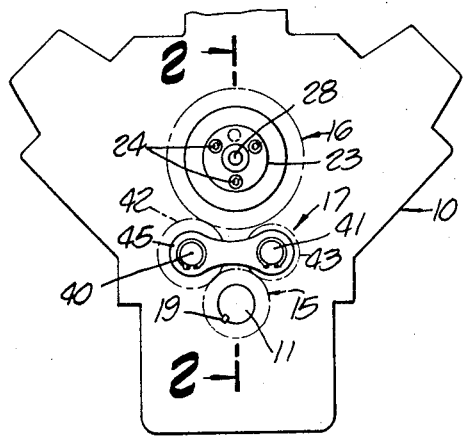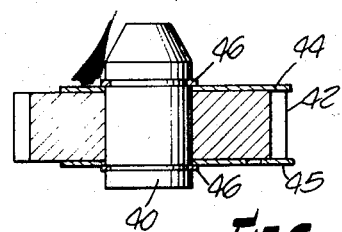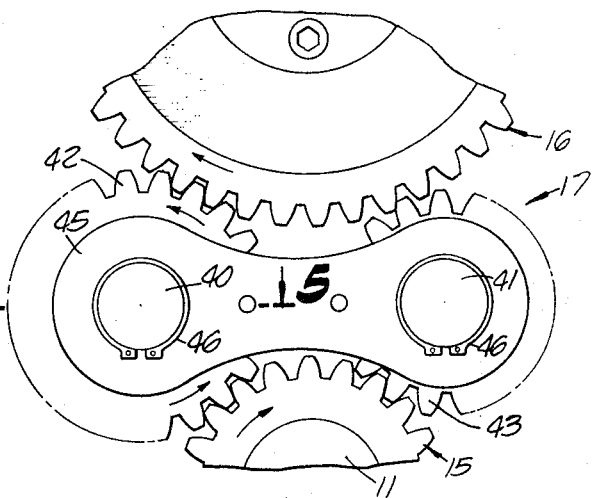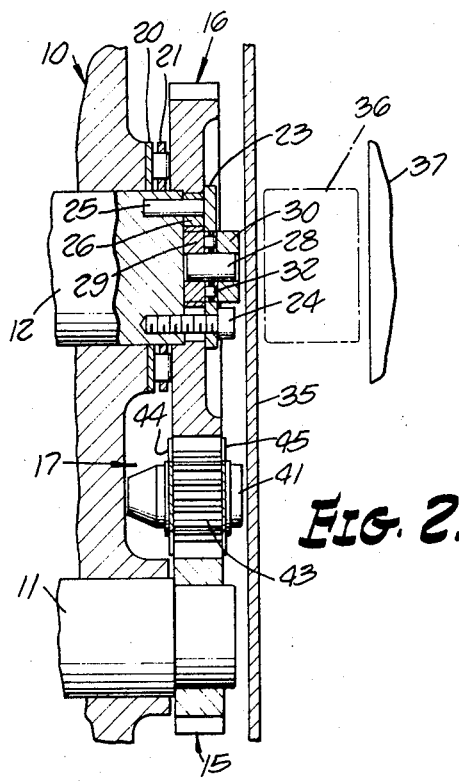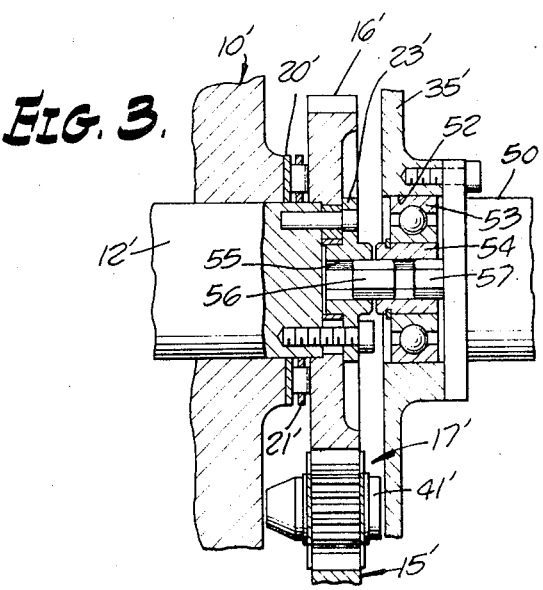
INVENTOR
MAURUS E. JACKSON
BY
ATTORNEYS

CAMSHAFT DRIVE CONVERTER KIT AND METHOD

This invention relates to engine camshaft drive mechanisms, and more particularly to a unique mode of converting a stock auto engine from chain drive to precision gear drive to enhance its power output and its high speed performance characteristics.

It has long been recognized that chain driven camshafts have serious limitations and adverse operating characteristics under high speed racing conditions. In consequence, there have been various proposals for converting the camshaft of a stock engine from chain to gear drive. Unfortunately, these prior proposals are subject to serious objections and disadvantages among which is the attending high material and labor costs to make the conversion and the need for making alterations in the engine with a precision seldom if ever attainable outside a properly equipped factory. For example, prior proposals employ various means for mounting an idler gear interconnecting the crankshaft and camshaft gears on the engine block and requiring precision boring and machining operations on the engine in order for the axis of the idler gear to be precisely located relative to the axes of the cam and crankshafts. Any misalignment or error in the location of the idler axis can result in early failure of the new drive and unacceptable engine performance. Moreover, the conversion can usually be made only by removal of the engine from the vehicle and it is oftentimes impossible or impractical to attempt correction of any error in the machining operation required for the conversion. Furthermore, both the cost of the conversion components and the labor involved in their installation are very high.

With the foregoing and other shortcomings and disadvantages of prior proposals in mind, there is provided by this invention a converter kit of simple, relatively inexpensive components which can be readily installed in a stock engine to take the place of conventional chain drive for the engine camshaft. The kit components are easily installed by removing the cam drive cover plate, the drive chain and the two supporting sprockets therefor and replacing these components with the kit components before replacing the cover plate. No machining operation of any kind is required on any part of the engine and it is merely necessary to install a drive spur gear on the crankshaft, a second spur gear on the camshaft following which the idler subassembly is inserted axially between the crankshaft and camshaft gears. The idler subassembly is not secured to any engine component and has limited freedom of movement both as respects its own individual components thereof and as respects the subassembly as a whole relative to the two spur gears which it floatingly interconnects. The idler subassembly and its principal idler gear are so arranged and constructed as to shift automatically into precise operating position between the two spur gears as an incident to starting the engine following which they remain firmly and positively in a precise operating position so essential to high engine performance. The idler subassembly is retained in its installed position simply by replacing the cam drive cover plate and is exposed and freed for redrawal merely by detaching the cover plate.

The converter kit preferably includes a limited number of auxiliary components including a thrust bearing for the camshaft gear as well as provision for adjusting the cam gear in its assembled relationship to the camshaft by the use of a selected one of several eccentrics.

The idler subassembly includes a pair of idler gears the first of which preferably is of the same size and has the same number of teeth as the crankshaft gear and the second of which has at least one less tooth. These two gears each have limited lost motion or play with respect to their own supporting shaft and are held assembled to one another by linkage means proportioned to support the main idler gear in a precise driving relation between the crankshaft and camshaft gears and with the second and smaller idler loosely in mesh with these same gears. So long as the engine is operating the larger of the two idler gears shifts automatically into proper driving relationship while the second and smaller idler rotates under no load. Accordingly it will be recognized that the second idler serves normally to retain the larger or power idler in approximate operating position from which the latter shifts readily and automatically into precise operating position as soon as the engine is being started. Conversely, the first idler serves the same purpose when and if the engine turns backwardly.

Accordingly it is a primary object of the present invention to provide a simple, rugged, inexpensive converter kit and method by which a stock auto engine equipped with chain camshaft drive can be converted to gear drive with superior high speed performance characteristics.

Another object of the invention is the provision of means for equipping an internal combustion engine with a gear driven camshaft utilizing a floatingly supported idler gear to interconnect the crankshaft and camshaft gears.

Another object of the invention is the provision of substitute camshaft drive components for a stock automotive engine and wherein the crankshaft and camshaft gears are interconnected by a pair of floatingly supported idler gears one of which shifts automatically into precise operating position as an incident to starting the engine.

Another object of the invention is the provision of a gear camshaft drive for a stock automotive engine using components installable thereon in lieu of its original chain drive and designed for installation without need for engine alterations or a substitute cam drive cover plate.

Another object of the invention is the provision of a conversion kit for use in converting an auto engine from chain to gear driven camshaft operation and including a power takeoff for driving an additional engine auxiliary.

Another object of the invention is the provision of a converter kit for converting a stock auto engine from chain to gear camshaft drive utilizing a floating idler gear maintained in assembled position essentially by abutment with the cam drive cover plate.

These and other more specific objects will appear upon reading the following specification and claims and upon considering in connection therewith the attached drawing to which they relate.

FIG. 1 is a generally diagramatic view of the front end of a typical auto engine indicating the position occupied by the invention components prior to assembly of the cam drive cover plate;

FIG. 2 is a fragmentary cross sectional view on an enlarged scale taken along line 2—2 on FIG. 1;

FIG. 3 is a fragmentary view similar to FIG. 2 but showing a slightly modified cam gear equipped with a power takeoff journaled in the cam drive cover plate;

FIG. 4 is a fragmentary front elevational view of the idler subassembly in its normal engine operating condition; and FIG. 5 is a fragmentary cross sectional view taken along line 5—5 on FIG. 4.

Referring more particularly initially to FIG. 1, there is shown, somewhat diagramatically, a typical stock 8-cylinder auto engine 10, having a crankshaft 11 and a camshaft 12 projecting from the forward end of the engine block. As manufactured, this engine has separate sprockets on the respective shafts interconnected by a link chain operating to drive the camshaft clockwise and in the same direction as the engine crankshaft. Although not shown, it will be understood that these cam drive components are normally covered by a cover plate 35 bolted to the front end of the engine block.

The present invention provides a converter kit containing all components necessary to convert the camshaft from chain to gear drive including, as principal components, a crankshaft spur gear 15, a camshaft spur gear 16, and an idler subassembly 17, along with certain incidental fittings and assembly expedients which will be described presently. It will be understood that the two spur gears 15,16 are loosely secured to their respective shafts following which the idler subassembly 17 is inserted axially with its two idler gears meshing with gears 15,16.

The assembly of the kit components is carried out in the following manner after dismantling the chain drive. Crankshaft spur gear 15 is mounted over the forward end of crankshaft 11 and secured in place by the usual key 19 (FIG. 4). Prior to mounting spur gear 16 on camshaft 12, a thrust bearing plate 20 (FIG. 2) is telescoped over the end of the camshaft after which the needle bearing assembly 21 is put in position followed by camshaft spur gear 16. The latter is held in place by a retaining washer 23 and cap screws 24. Prior to assembly of washer 23 and cap screws 24, a selected one of an assortment of slightly different timing eccentrics 26 is inserted over the outer end of a dowel 25 anchored in the end of the camshaft; this dowel and the associated timing eccentrics 26 are of the same construction well known to those skilled in engines of this type and knowledgeable respecting the function of these eccentrics to achieve a desired precision drive relationship between the engine crankshaft and its camshaft. The use of a particular eccentric changes the relative position of the cam gear on the camshaft and alters the point in the engine cycle at which the valves open and close.

Following the securement of the cam gear 16 to the camshaft a thrust bearing assembly is mounted in the central opening of retainer washer 23. This thrust bearing comprises a stub shaft 28, a pair of hardened rings 29,30 and a needle bearing assembly 32. This thrust bearing assembly merely seats against the end of the camshaft with its outer end closely spaced to the interior side of the cam drive cover plate 35.

Some operators provide additional backup for the thrust bearing just described by inserting a wedge block, indicated in dot and dash lines 36, with one face bearing against the exterior of cover plate 35 and its other face bearing against a rigid portion of the vehicle frame indicated at 37. Wedge 36 is secured in a desired position in any suitable manner.

Referring now to FIGS. 4 and 5, there is shown one suitable type of idler subassembly 17 designed for limited floating support between crankshaft gear 15 and camshaft gear 16. This simple subassembly, which shifts automatically into a snug precision operating relation between gears 15 and 16, comprises a pair of short stub shafts 40,41 having a loose fit within the respective central bores of a power idler 42 and a safety idler gear 43. These gears are held in a desired assembled relationship by a pair of connector links 44,45 (FIGS. 2, 5) and spring keeper rings 46 thereby facilitating the insertion of the subassembly as a unit between gears 15 and 16. However, once all four gears are assembled as shown in FIG. 4, links 44,45 perform no essential function, as can be readily demonstrated by operating the engine with and without these links. In other words, gears 42 and 43 remain firmly in mesh between gears 15 and 16 entirely independently of shafts 40,41 and of links 42,43. If the engine rotates clockwise as shown in FIG. 4, gear 42 is held firmly captive and effective to drive gear 16 clockwise, thereby preventing gear 43 from being ejected bodily to the right and out of mesh with gears 15 and 16. If on the other hand the engine rotates counterclockwise, the reverse action occurs with gear 43 held firmly in mesh between gears 15 and 16 and effective to rotate gear 16 counterclockwise and thereby preventing gear 42 from being ejected bodily to the left.

The relatively large clearance between gears 42, 43 and their supporting shafts, such as five to 10 mils or even more enables power idler 42 to seek a precision driving relation between gears 15,16 as the engine starts to rotate when starting. It is merely necessary that the power idler 42 be supported in reasonably close proximity to its proper operating position and that it be sized so that its teeth intermesh with the teeth of gears 15,16 to lock the gears in meshing relationship so long as the engine is operating in its normal forward direction.

As shown in FIG. 4 the crankshaft rotates clockwise driving idler 42 counterclockwise thereby driving camshaft gear 16 clockwise. As herein illustrated, gear 15 and power idler 42 are the same size and have the same number of teeth. If the teeth of the three gears are in mesh initially the rotation of the engine crankshaft acts to shift power idler 42 into precise rolling contact with the pitch surfaces of the teeth on gear 16 and to maintain the gears in smooth precision driving relation provided the idler gear is free to shift to a limited degree and as necessary for precision mating.

The requisite freedom of movement is readily provided if there is suitable limited freedom between the bore of gear 42 and its supporting stub shaft 40. As mentioned above a clearance of five to 10 mils between the floor and the O.D. of the shaft has been found to provide excellent results and long service life. A similar clearance is desirably present between the bore of the normally load-free idler 43 and its shaft 41.

Owing to the fact that gear 43 has a lesser number of teeth than gear 42 and the provision of limited freedom of movement, gear 43 normally rests in contact with cam shaft gear 15 and has only light if any contact with the teeth of gear 16. It therefore functions as supplemental means safeguarding against the possibility of disengagement of gear 42 frog gears 15,16.

Normally an engine equipped with the invention drive gears has its engine drive shaft connected directly to the rear wheels. Accordingly should the car be moved along the ground in a reverse direction the engine will be rotated counter to its normal operating direction. In this event, idler 43 becomes a power drive connection between the crankshaft and the camshaft and this action causes gear 43 to shift in a direction to mate more fully with the teeth of gear 16. However, this movement is limited and insufficient to permit the teeth of gear 42 to move out of meshing engagement with gears 15,16.

It will also be noted that the ends of shafts 40,41 have limited axial play between the forward end of the engine block and the interior surface of cover plate 35, a feature best illustrated in FIG. 2. It will therefore be recognized that these shafts act to maintain the idler subassembly 17 accurately positioned in the plane of gears 15,16 so long as the cover plate is in position. However, as soon as the cover plate is detached subassembly 17 is free for bodily axial movement from its assembled operating position.

Referring now to FIG. 3 there is illustrated a slight modification of the construction just described and differing essentially in the provision of a power takeoff from the cam gear to some engine auxiliary, such as a pump of any conventional construction having a housing indicated at 50. The same or similar components of the FIG. 3 embodiment are distinguished by the same reference characters distinguished by the addition of a prime. It will be noted that cover plate 35' includes an outlet opening 52 in which is mounted an antifriction bearing assembly 53 supporting a sleeve 54 of the power takeoff coupling. Washer 23' holding cam gear 16' to the camshaft is provided with a non-circular opening 55 seating a complementally shaped coupling 56 having a similar seating engagement with coupling sleeve 54 and effective to drive the shaft 57 of a pump 50, or some other engine auxiliary.

While the particular camshaft drive converter kit and method herein shown and disclosed in detail is fully capable of attaining the objects and providing the advangages hereinbefore stated, it is to be understood that it is merely illustrative of the presently preferred embodiments of the invention and that no limitations are intended to the detail of construction or design herein shown other than as defined in the appended claims.

I claim:

1. That improvement in an internal combustion engine of the type having a camshaft gear driven by a chain in mesh with a crankshaft gear which improvement includes substitute crankshaft and camshaft gears, idler gear converter means substituted for the chain drive, said converter means including an idler gear mounted between said crankshaft and camshaft gears and in mesh therewith, and said mounting means including means for loosely and floatingly supporting said idler gear independently of the shaft for said camshaft and crankshaft gears with limited freedom to move in the plane thereof into accurate operating relationship between said crankshaft and camshaft gears.

2. That improvement defined in claim 1 characterized in that said mounting means for said idler gear includes a shaft for said idler gear having a substantial amount of radial play relative to the shaft bore of said idler gear.

3. That improvement defined in claim 1 characterized in that said mounting means for said idler gear includes an idler shaft for said idler gear and support means therefor having limited freedom of movement in the plane of each of said gears.

4. That improvement defined in claim 3 characterized in that said idler gear and said mounting means therefor are freely shiftable axially into and out of meshing engagement with the teeth of said crankshaft and camshaft gears when the latter gears are exposed for servicing.

5. That improvement defined in claim 4 characterized in the provision of a removable cover plate for said crankshaft and camshaft gears, and in that said cover plate serves as the means for holding said idler gear and the mounting means therefor in assembled operating relationship.

6. That improvement defined in claim 5 characterized in that the disassembly of said cover plate leaves said idler gear and the mounting means therefor fully assembled between said crankshaft and camshaft gears and free for disassembly therefrom at the operator's option.

7. That improvement defined in claim 1 characterized in that said mounting means for said idler gear includes a second idler gear having a normally loose nondriving but intermeshing connection with the teeth of said crankshaft and camshaft gears.

8. That improvement defined in claim 7 characterized in that said mounting means includes link means interconnecting respective shaft means for each of said idler gears.

9. That improvement defined in claim 8 characterized in that said link means includes a link disposed beside either lateral face of said idler gears and embracing an adjacent end of the respective shafts for said idler gears.

10. That improvement defined in claim 9 characterized in that said idler gears, the shafts therefor and said links comprise a self-contained unitary sub-assembly adapted to be azially assembled between and disassembled from said crankshaft and camshaft gears while said cover plate is detached and without need for performing any other assembly or disassembly operation on the interior side of said cover plate.

11. That improvement defined in claim 1 characterized in that said idler gear and the mounting means therefor are so constructed and arranged relative to said crankshaft and camshaft gears that the operation of said engine in a direction to deliver power from its crankshaft is effective to hold said idler gear in proper and continuous accurate mating relation with the teeth of said crankshaft and camshaft gears.

12. That improvement defined in claim 10 characterized in that the shafts of said idler gears are disconnected from but spaced closely adjacent the adjacent interior surfaces of said cover plate and the surface of the engine block.

13. That improvement in claim 12 characterized in that said second idler gear has at least one less tooth than said first mentioned idler gear.

14. That method of converting a conventional automotive engine from chain to gear-driven camshaft operation without need for costly and time-consuming engine alterations which comprises: dismantling the stock drive components for the camshaft, installing new crankshaft and camshaft gears along with a floating idler gear unit between the camshaft and crankshaft gears, and reassembling the cam chain cover plate thereby to hold said idler gear unit in assembled operating position.

15. That method defined in claim 14 characterized in the step of utilizing an idler gear unit which is self-contained and self-supporting between said crankshaft and camshaft gears without reliance on anchor devices secured to any other part of the engine including the cover plate for said crankshaft and camshaft gears.

16. That method defined in claim 15 characterized in the step of utilizing an idler gear unit having a power idler gear supported with limited freedom of movement in the plane thereof and of said crankshaft and camshaft gears and free to shift to a position meshing accurately and precisely with said crankshaft and camshaft gears.

17. That method defined in claim 14 characterized in the step of utilizing an idler gear unit having a pair of idler gears loosely interconnected by linkage means extending crosswise of a plane passing through the axes of said crankshaft and camshaft gears.

18. That method defined in claim 14 characterized in the step of installing thrust bearing means between the engine block and the adjacent face of said camshaft gear.

19. That method defined in claim 14 characterized in the step of providing a power take-off drive connection between said camshaft gear and an auxiliary accessory for said engine.

20. A converter kit for use in converting a stock auto engine from use with a chain driven camshaft to operation with a precision gear drive from the engine camshaft, said converter kit including spur crankshaft and camshaft gears with means for anchoring the same respectively to the engine camshaft and to the engine crankshaft, an idler subassembly adapted to be floatingly mounted with limited freedom of movement between and in mesh with said crankshaft and camshaft gears, respectively, and including a power transmitting idler gear which is shiftable automatically into precision driving relation as an incident to starting the engine.

21. A converter kit as defined in claim 20 characterized in that idler subassembly includes an idler gear having provision for limited bodily shifting movement in the plane thereof as the engine starts and to the extent necessary to provide precision synchronized operation of the engine camshaft and crankshaft.

22. A converter kit as defined in claim 21 characterized in that said idler subassembly includes a pair of idler gears held assembled to one another by interconnecting linkage means and which idler gears have a slightly different number of teeth.

23. A converter kit as defined in claim 22 characterized in that said idler subassembly has limited bodily freedom of movement as a unit in an area between said crankshaft and camshaft gears when assembled to an engine.

24. A converter kit as defined in claim 23 characterized in that said idler subassembly is adapted to be secured in its installed operating position on an engine by securing the cover plate in place thereon for said crankshaft and camshaft gears.

25. A converter kit as defined in claim 20 characterized in the provision of a substitute cover plate usable in lieu of the stock cover plate, and said substitute cover plate and said camshaft gear including power take-off coupling means adapted to drive an engine auxiliary from said cam gear when the kit components are installed on an engine.

26. That improvement defined in claim 21 characterized in that the axis of said idler gear is located laterally to the left of a plane coincident with the axes of said crank and cam shaft gears when the engine is designed to operate said last mentioned gears clockwise whereby said idler gear is automatically held captively in mesh with said crank and camshaft gears so long as the engine is operating.

27. That improvement defined in claim 26 characterized in the provision of a second floatingly-supported idler gear in mesh with said crank and camshaft gears with its axis located on the opposite side of said plane coincident with the axis of said crank and camshaft gears, and said second idler gear being automatically held in mesh between said crank and camshaft gears while the engine is operating by the cooperating movement of said crank and camshaft gears and said first mentioned idler gear and operating in synchronism.

28. That improvement in a machine having two parallel shafts each equipped with a gear, first and second idler gears floatingly in mesh with each of said first mentioned gears in areas disposed on the opposite sides of a plane common to the axes of said two shafts, and a particular one only of said idler gears being in driving contact with said both of said shaft-mounted gears depending on the direction of rotation of the driving shaft and the other one of said idler gears being loosely supported between said shaft-equipped gears.

29. That improvement defined in claim 28 characterized in that each of said gears is free of a radical flange at either axial end of the teeth thereof.

30. That improvement defined in claim 7 characterized in that said second idler gear is effective to drive said cam shaft gear upon reverse rotation of said crankshaft gear, thereby to drive said first idler gear in a direction to hold said first idler gear in mesh with said cam and crankshaft gears.

* * * * *